(12) United States Patent
Bae et al.

(10) Patent No.: US 12,548,230 B2
(45) Date of Patent: Feb. 10, 2026

(54) MPI LAYER GEOMETRY GENERATION METHOD USING PIXEL RAY CROSSING

(71) Applicant: ELECTRONICS AND TELECOMMUNICATIONS RESEARCH INSTITUTE, Daejeon (KR)

(72) Inventors: Seong Jun Bae, Daejeon (KR); Jung Won Kang, Daejeon (KR); Soo Woong Kim, Daejeon (KR); Ji Hoon Do, Daejeon (KR); Gun Bang, Daejeon (KR); Jin Ho Lee, Daejeon (KR); Ha Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 134 days.

(21) Appl. No.: 18/503,266

(22) Filed: Nov. 7, 2023

(65) Prior Publication Data

US 2024/0161380 A1 May 16, 2024

(30) Foreign Application Priority Data

Nov. 7, 2022 (KR) .................. 10-2022-0147400
Nov. 3, 2023 (KR) .................. 10-2023-0150690

(51) Int. Cl.
*G06T 15/00* (2011.01)
*G06T 9/00* (2006.01)

(52) U.S. Cl.
CPC .............. *G06T 15/00* (2013.01); *G06T 9/00* (2013.01)

(58) Field of Classification Search
CPC . G06T 9/00; G06T 11/00; G06T 15/00; G06T 7/85; G06T 2207/20221; G06T 7/70; G06T 15/06; H04N 19/597
See application file for complete search history.

(56) References Cited

U.S. PATENT DOCUMENTS

2022/0377302 A1* 11/2022 Fleureau .............. H04N 13/161
2023/0069614 A1* 3/2023 Khan .................... G06T 15/205

FOREIGN PATENT DOCUMENTS

| KR | 1020210089068 A | 7/2021 |
| WO | 2022063953 A1 | 3/2022 |

OTHER PUBLICATIONS

Tinghui Zhou, et al., Stereo Magnification: Learning view synthesis using multiplane images, ACM Trans. Graph., vol. 37, No. 4, Article 65. Publication date: Aug. 2018, arXiv: 1805.09817v1 [cs.CV] May 24, 2018.

* cited by examiner

*Primary Examiner* — Hau H Nguyen
(74) *Attorney, Agent, or Firm* — Rabin & Berdo, P.C.

(57) ABSTRACT

A pixel ray crossing-based multi-viewpoint MPI geometry generation method, device, and recording medium of the present disclosure, the method may comprise obtaining a multi-viewpoint image by original cameras which shoot a different viewpoint, obtaining a multi-plane image (MPI) based on the multi-viewpoint image, obtaining, based on the MPI, an atlas image in a 2D form, and obtaining a bitstream by encoding the atlas image.

9 Claims, 12 Drawing Sheets

< 1D camera array >
4A

< 2D camera array >
4B

MPI LAYER GEOMETRY GENERATION METHOD USING PIXEL RAY CROSSING

CROSS-REFERENCE TO RELATED APPLICATIONS

This application claims the benefit of earlier filing date and right of priority to Korean Application NO. 10-2022-0147400, filed on Nov. 7, 2022, and priority to Korean Application NO. 10-2023-0150690, filed on Nov. 3, 2023, the contents of which are all hereby incorporated by reference herein in their entirety.

TECHNICAL FIELD

The present disclosure describes a method of generating a multi-plane image (MPI) expression form which enables the synthesis of a view image at a random viewpoint by using plenoptic multi-plane 3D (3-Dimension) data (Multi Plane Image Data) having several different color values according to an incidence angle.

BACKGROUND ART

Multi-plane 3D data (hereinafter, MPI: Multi Plane Image) is a 3D spatial expression method which reconfigures a 3D space into layers in a depth direction to place a pixel in a space on a plane in each depth direction.

A MPI-based spatial expression method may acquire relatively high image quality when freely rendering a space at a random viewpoint, but does not require high-quality depth information, the biggest factor in maintaining image quality when expressing actual image-based spatial information, so it is used in various ways as a new 3D actual image spatial expression method.

DISCLOSURE

Technical Problem

The present disclosure is to provide a new MPI data configuration method which does not cause image distortion in rendering according to a geometric segmentation phenomenon.

Technical Solution

The present disclosure provides a new MPI data configuration method that does not cause image distortion during rendering due to geometric segmentation phenomenon.

A pixel ray crossing-based multi-viewpoint MPI geometry generation method, device, and recording medium of the present disclosure, the method may comprise obtaining a multi-viewpoint image by original cameras which shoot a different viewpoint, obtaining a multi-plane image (MPI) based on the multi-viewpoint image, obtaining, based on the MPI, an atlas image in a 2D form, and obtaining a bitstream by encoding the atlas image, obtaining the MPI may be performed by projecting shot positions in a space for one shooting object onto a MPI layer plane for each of the original cameras, and positions that the shot positions in the space may be projected onto the MPI layer plane are different from each other.

In a pixel ray crossing-based multi-viewpoint MPI geometry generation method, the MPI layer plane may be a MPI layer plane which is closest to the original cameras In a pixel ray crossing-based multi-viewpoint MPI geometry generation method, the projection may be performed based on a position coordinate of an original camera in a world coordinate system, a position coordinate of the one shooting object and a distance between the MPI layer plane and the one shooting object.

In a pixel ray crossing-based multi-viewpoint MPI geometry generation method, the atlas image may be configured with a RGB image and an Alpha image.

Technical Effect

According to the present disclosure, resolving the distortion of an original image according to a geometric segmentation phenomenon which occurs in the existing MPI layer configuration method which considers only geometric information in a space enables MPI-based random view rendering that a geometric segmentation phenomenon does not occur.

BEST MODE

Figure 1:
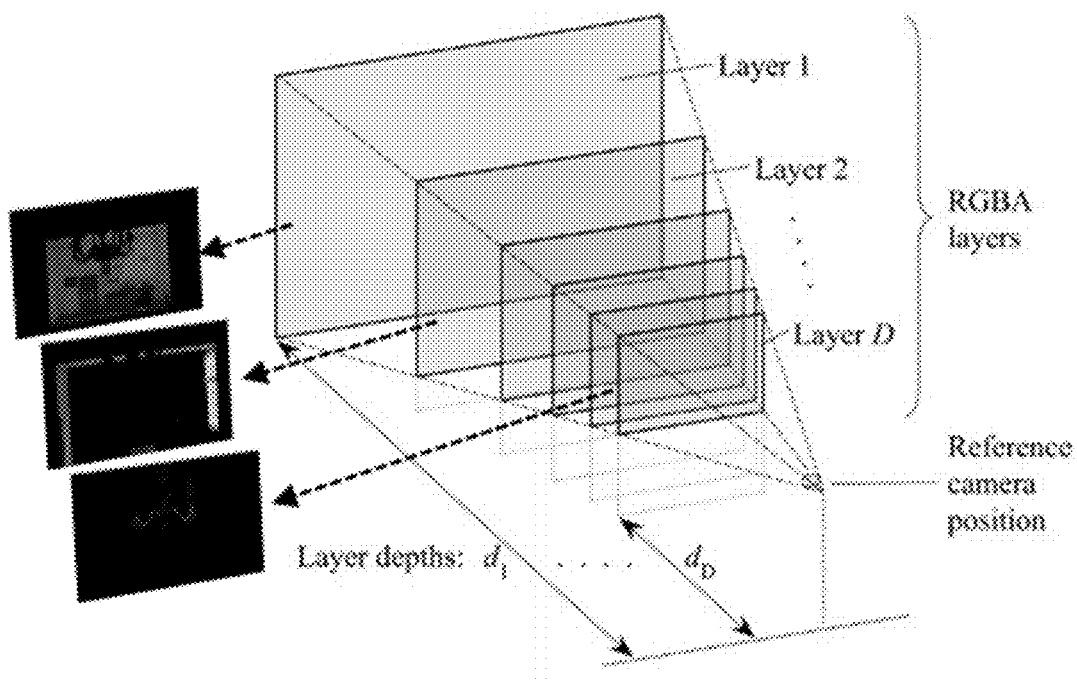
FIG. 1 a diagram showing a data structure of a MPI.

Hereinafter, in reference to the accompanying drawings, an embodiment of the present disclosure is described in detail so that a person with ordinary skill in the art to which the present disclosure pertains can easily perform it. But, the present disclosure may be implemented in several different forms and is not limited to an embodiment described herein. And, in order to clearly describe the present disclosure in a drawing, a part which is not related to a description was omitted and a similar reference numeral was attached to a similar part throughout the specification.

In the specification, when a part is referred to as being connected to another part, it may include not only a direct connection relationship, but also an electrical connection relationship that there is another element therebetween. In addition, when a part is referred to as including an element, it means that it may further include another element instead of excluding another element unless otherwise objected.

In the specification, when a part is referred to as including an element, it means that it may further include another element instead of excluding another element unless otherwise objected. A step of (doing) ~~~ or a step of ~~~, a term of degree used throughout this specification, does not mean a step for ~~~.

In addition, a term such as first, second, etc. may be used to describe various components, but the components should not be limited by the terms. The terms are used only to distinguish one component from other components.

In addition, as construction units shown in an embodiment of the present disclosure are independently shown to represent different characteristic functions, it does not mean that each construction unit is composed in a construction unit of separate hardware or one software. In other words, each construction unit is described by being enumerated as each construction unit for convenience of a description, and at least two construction units of each construction unit may be combined to form one construction unit or one construction unit may be divided into a plurality of construction units to perform a function. An integrated embodiment and a separate embodiment of each construction unit are also included in a scope of a right of the present disclosure unless they are beyond the essence of the present disclosure.

First, a term used in this application is briefly described as follows.

A video decoding apparatus which will be described below may be a device included in a server terminal such as a personal computer (PC), a laptop computer, a portable multimedia player (PMP), a wireless communication terminal, a smart phone, a TV application server, a service server, etc. and may mean a variety of devices equipped with a user terminal such as all kinds of devices, etc., a communication device such as a communication modem, etc. for communicating with wired and wireless communication networks, a memory for storing various programs and data for inter or intra prediction to encode or decode an image, a microprocessor for executing a program to perform operation and control and others.

In addition, an image encoded in a bitstream by an image encoding device may be transmitted to an image decoding device through various communication interfaces such as a cable, a universal serial bus (USB), etc. or through a wired or wireless communication network, etc. such as Internet, a wireless local area network, a wireless LAN network, a wibro network, a mobile communication network, etc. in real or non-real time and may be decoded, reconstructed into an image and regenerated.

Typically, a video may be configured with a series of pictures and each picture may be partitioned into high-level coding structures such as a slice and a tile and coding units in a form of a block such as a CTB, a PB, a CB, etc. In addition, according to an embodiment, a coding structure and a block may be partitioned in a circular or atypical form as well as a polygonal form such as a triangle, a rhombus, a parallelogram, etc., not in a form of a square or a rectangle.

A person with ordinary skill in the art to which this invention pertains may understand that a term "picture" described below may be used by being replaced with other terms with the equivalent meaning such as image, frame, etc.

Hereinafter, in reference to attached drawings, an embodiment of the present disclosure is described in more detail. In describing the present disclosure, an overlapping description for the same element is omitted.

FIG. 1 a diagram showing a data structure of a MPI.

A multi plane image (MPI) or a MPI-based spatial expression method of the present disclosure may be a 3D spatial expression method which reconfigures a 3D space into layers in a depth direction to place a pixel in a 3D space on a plane in each depth direction.

As a MPI in FIG. 1 is an embodiment of a MPI, it may configure a layer in a plane unit according to a depth based on a random position camera (reference camera position) and place a pixel in the layer.

Figure 2:
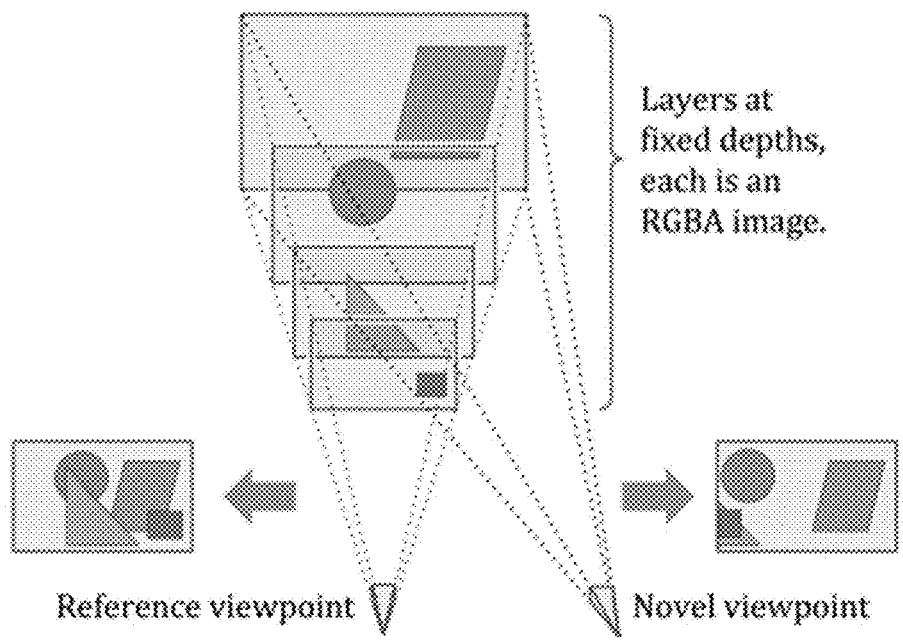
FIG. 2 shows an example of rendering a random new view (Novel viewpoint) by using a MPI.

FIG. 2 shows an example of rendering a random new view (Novel viewpoint) by using a MPI.

Compared to the existing point cloud or voxel method that all of each point freely floats at a random position in a space, a MPI-based spatial expression method has an advantage of being able to express a certain level of motion parallax even with a small amount of data by setting a limit that a point exists only in a plane (layer) unit. In addition, a view seen at a random camera position may be freely rendered. In reference to FIG. 2, when a rendering result of the existing view (reference viewpoint) is compared with a rendering result based on a different new view (Novel Viewpoint), a certain level of motion parallax may be obtained.

For a MPI-based spatial expression method, there may be various methods of generating a MPI without depth information by using machine learning, etc.

Figure 3:
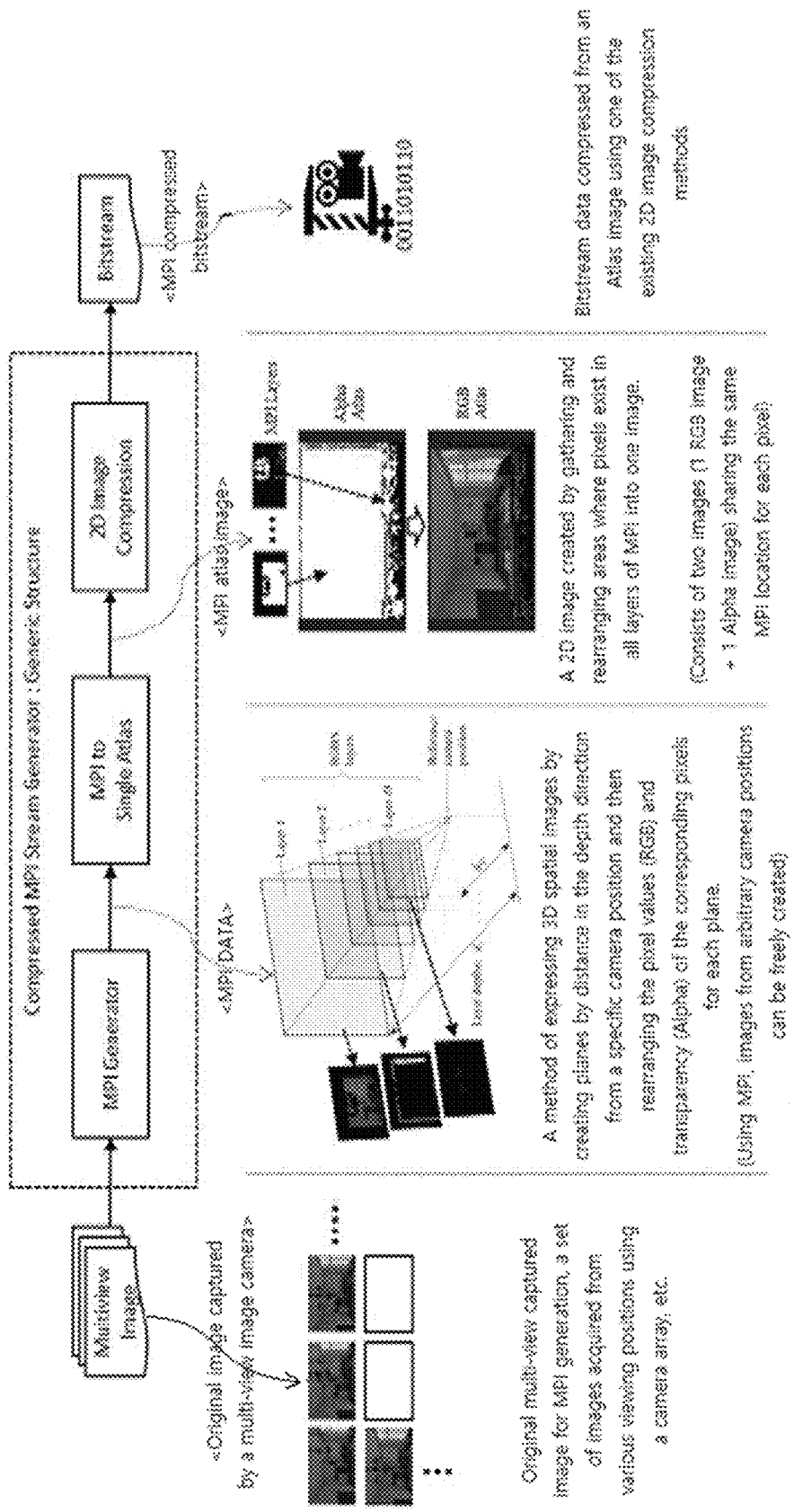
FIG. 3 shows a MPI-based encoding method.

FIG. 3 shows a MPI-based encoding method.

A MPI-based encoding method is performed by an encoded MPI bitstream generation device (a pixel ray crossing-based multi-viewpoint MPI geometry generation device), and an encoded MPI bitstream generation device may use a multi-view shooting image as an input value and use a bitstream as an output value.

A MPI-based encoding method may be configured with a MPI generation step, an atlas image generation step and a 2D image encoding step.

A MPI generation step is performed by a MPI generator of an encoded MPI bitstream generation device and may receive a multi-view shooting image as input. Here, a multi-view shooting image may be scenes shot at a variety of positions at the same time.

Figure 4:
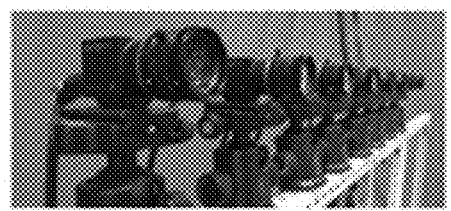
FIG. 4 shows a 1D and 2D arrayed camera arrangement for a multi-view shooting image.
Figure 4:
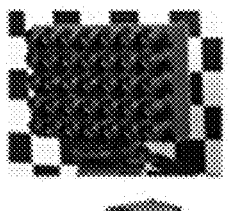

FIG. 4 shows a 1D and 2D arrayed camera arrangement for a multi-view shooting image.

A multi-view shooting image may be obtained by shooting with M×N 2D arrayed or N 1D arrayed cameras. FIG. 4A may show an example of a 1D arrayed camera arrangement and FIG. 4B may show an example of a 2D arrayed camera arrangement. Based on a MPI generated through the camera arrangements, an image at a random camera position in the camera arrangement may be rendered.

An atlas image generation step is performed by an atlas image generator of an encoded MPI bitstream generation device, and it may be a step of reconfiguring images of each layer of a MPI into one atlas image for MPI encoding.

An atlas image may be obtained by reconfiguring images of each layer at a random camera position into one image based on MPI data. In an atlas image generation step, not only an atlas image at a random camera position, but also an atlas image at another camera position for motion parallax may be generated. In other words, an atlas image for at least one viewpoint may be generated.

An atlas image may be configured with one RGB image and one Alpha image. In addition, an atlas image may be configured with one RGB image or one Alpha image. In addition, an atlas image may be configured with one image generated based on one RGB image and one Alpha image. When an atlas image is configured with one RGB image and one Alpha image, a RGB image and an Alpha image may share the same MPI position per pixel.

A 2D image encoding step is performed by a 2D image encoder of an encoded MPI bitstream generation device, and it may be a step of generating a bitstream by encoding a 2D atlas image. In this case, a video standard such as HEVC, H.263, VVC, etc. may be utilized as an encoding method.

Figure 5:
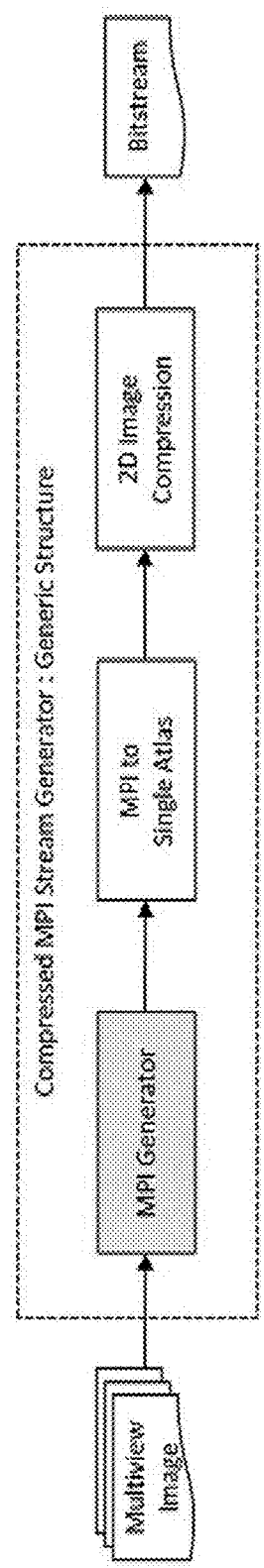
FIG. 5 is a diagram for describing an example of generating a MPI from a multi-view image.
Figure 6:
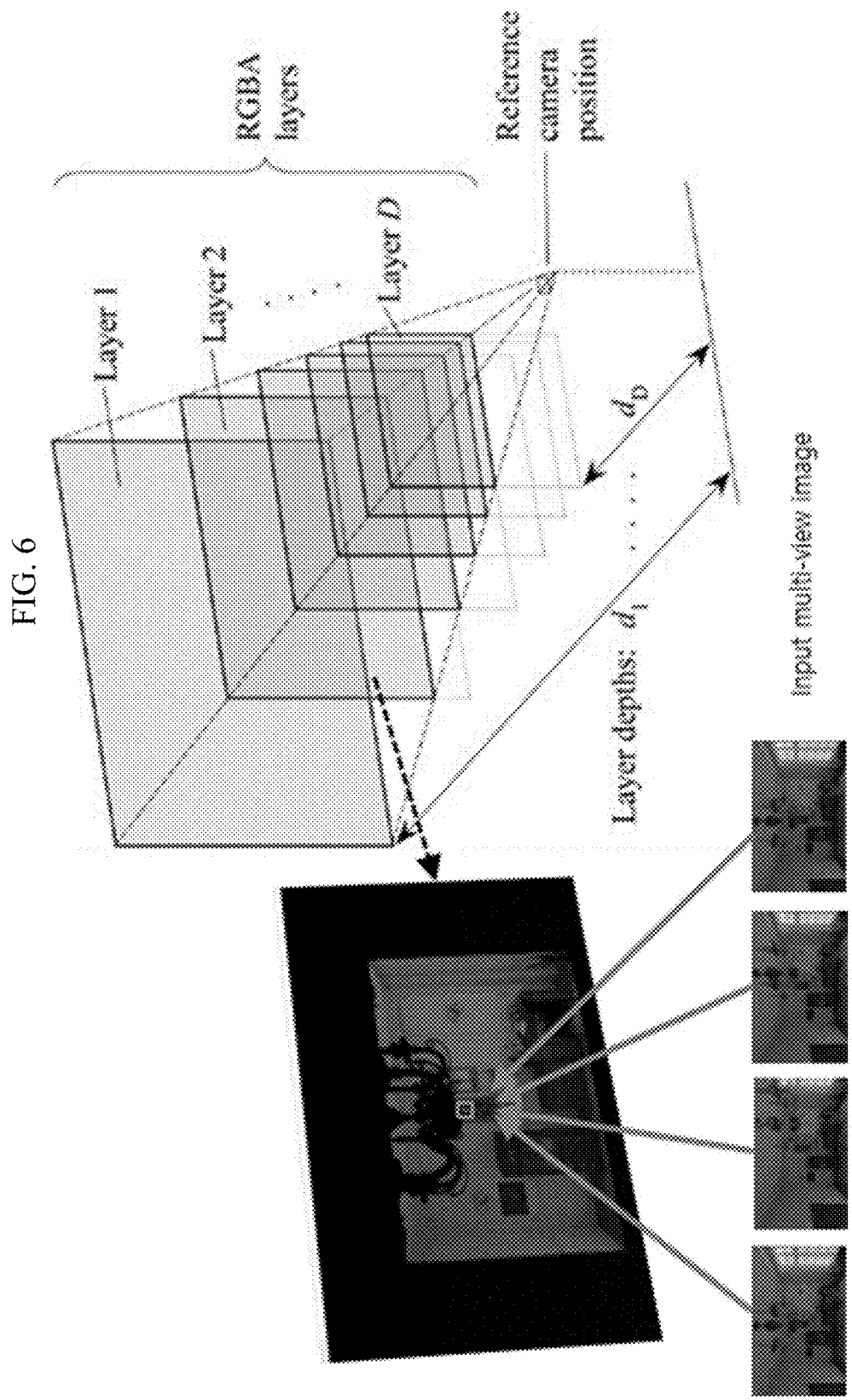
FIG. 6 shows an embodiment for MPI data of a multi-viewpoint image.

FIG. 5 is a diagram for describing an example of generating a MPI from a multi-view image. FIG. 6 shows an embodiment for MPI data of a multi-viewpoint image.

In reference to FIG. 5, in a MPI generator, a MPI may be generated from a multi-viewpoint image. When a MPI is generated from a multi-viewpoint image, as in FIG. 6, a MPI layer image is generated from several original images, and in this case, layers of a MPI may have a limited number (D in FIG. 6) without existing consecutively. According to the degree of a limit to the number of layers, geometric information distortion according to spatial quantization may occur.

Figure 7:
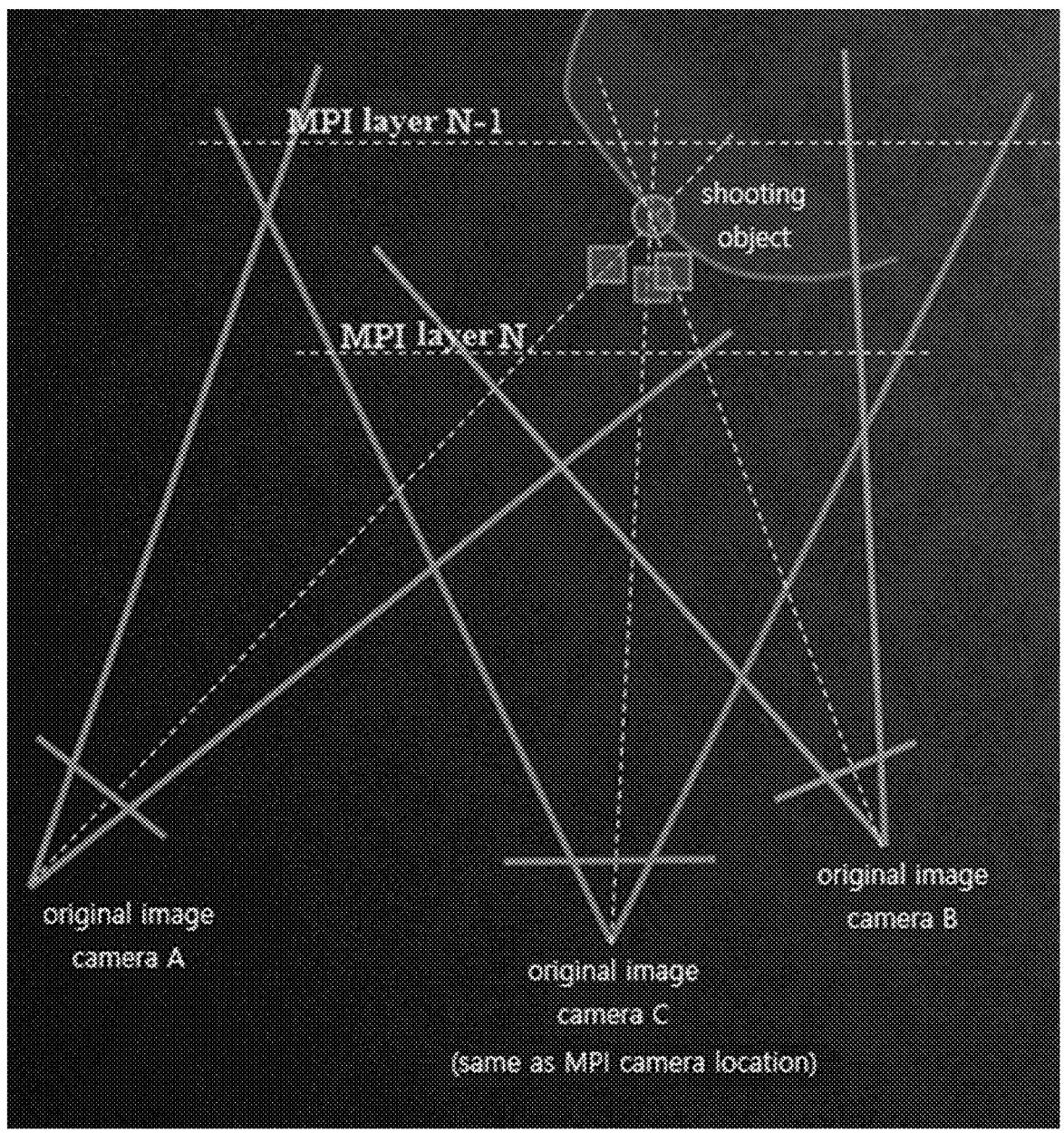
FIG. 7 is a diagram showing a spatial configuration of an original image shot with three cameras.

FIG. 7 is a diagram showing a spatial configuration of an original image shot with three cameras.

Specifically, FIG. 7 shows how a spatial configuration of an image is configured when a shooting object is shot with three original cameras A, B, and C. In this case, an example in which a MPI corresponding to a position of original camera B is configured is shown.

A 'square box' corresponding to each color in FIG. 7 may mean a pixel per camera that a shot position (a red circle) of a shooting object (red) in a space is shot by a respective camera.

In reference to FIG. 7, the same red circle may be shot as a yellow pixel in original camera A, may be shot as a green pixel in original camera B and may be shot as a blue pixel in original camera C.

[First MPI Layer Projection Method]

A first MPI layer projection method which considers only geometric information in a space (a position of a red circle in a space), as in FIG. 7, may be a method of projecting pixels shot from different original cameras onto a MPI layer plane (dotted lines of MPI layer N in FIG. 7) based on a MPI camera position (a position of original camera B in FIG. 7).

Figure 8:
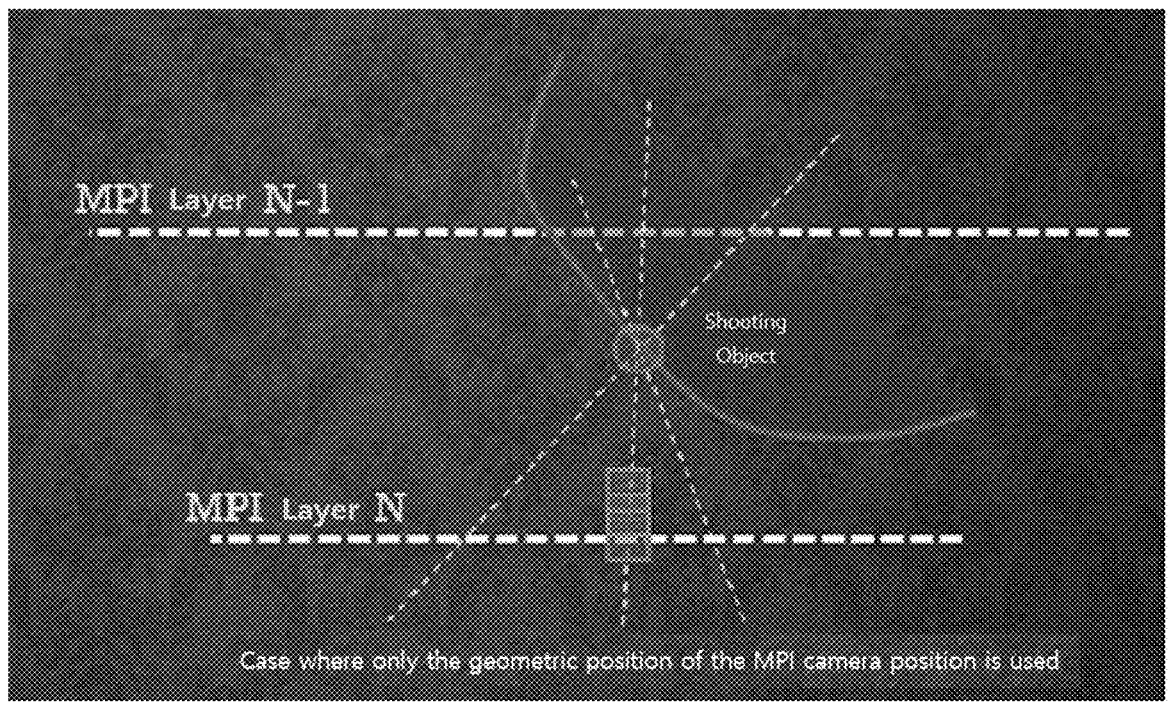
FIG. 8 shows an example of a first MPI layer projection method.

FIG. 8 shows an example of a first MPI layer projection method.

In reference to FIG. 8, like an orange solid line, all geometric positions of a shooting object (red) in a space of one MPI layer and a next MPI layer may be projected onto the nearest MPI layer plane based on a camera position (a spatial coordinate is quantized).

Figure 9:
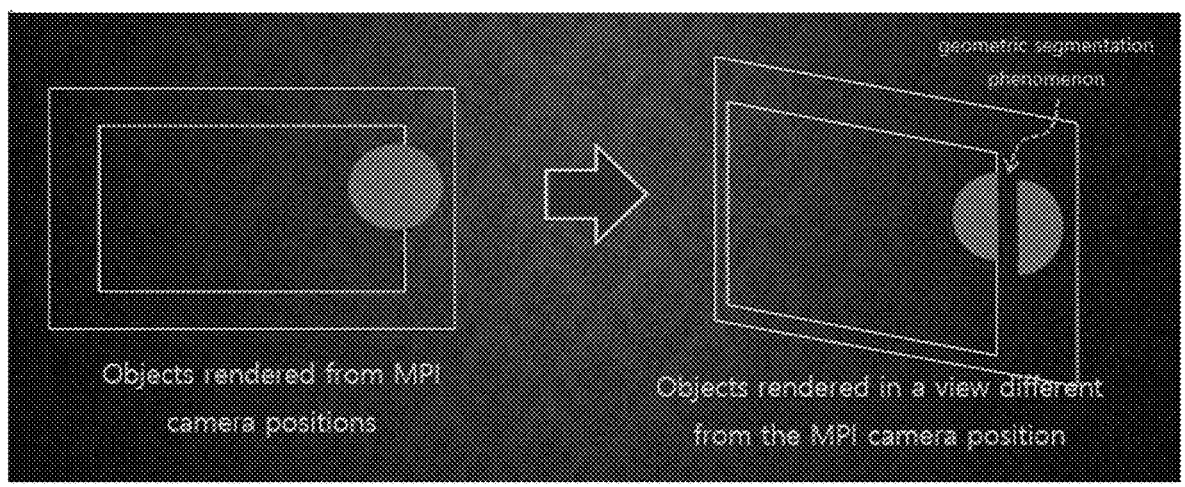
FIG. 9 is a diagram for describing geometric segmentation distortion according to a first MPI layer projection method.
Figure 10:
FIG. 10 shows an example of geometric segmentation distortion according to a first MPI layer projection method.

FIG. 9 is a diagram for describing geometric segmentation distortion according to a first MPI layer projection method. FIG. 10 shows an example of geometric segmentation distortion according to a first MPI layer projection method.

In reference to FIGS. 9 and 10, for a first MPI layer projection method, when a corresponding pixel is rendered at a view different from a MPI camera position, original image distortion (geometric segmentation distortion) according to a geometric segmentation phenomenon may occur along a segmentation plane of a MPI layer.

In order to remove this geometric segmentation distortion, a second MPI layer projection method is proposed below.

[Second MPI Layer Projection Method]

Figure 11:
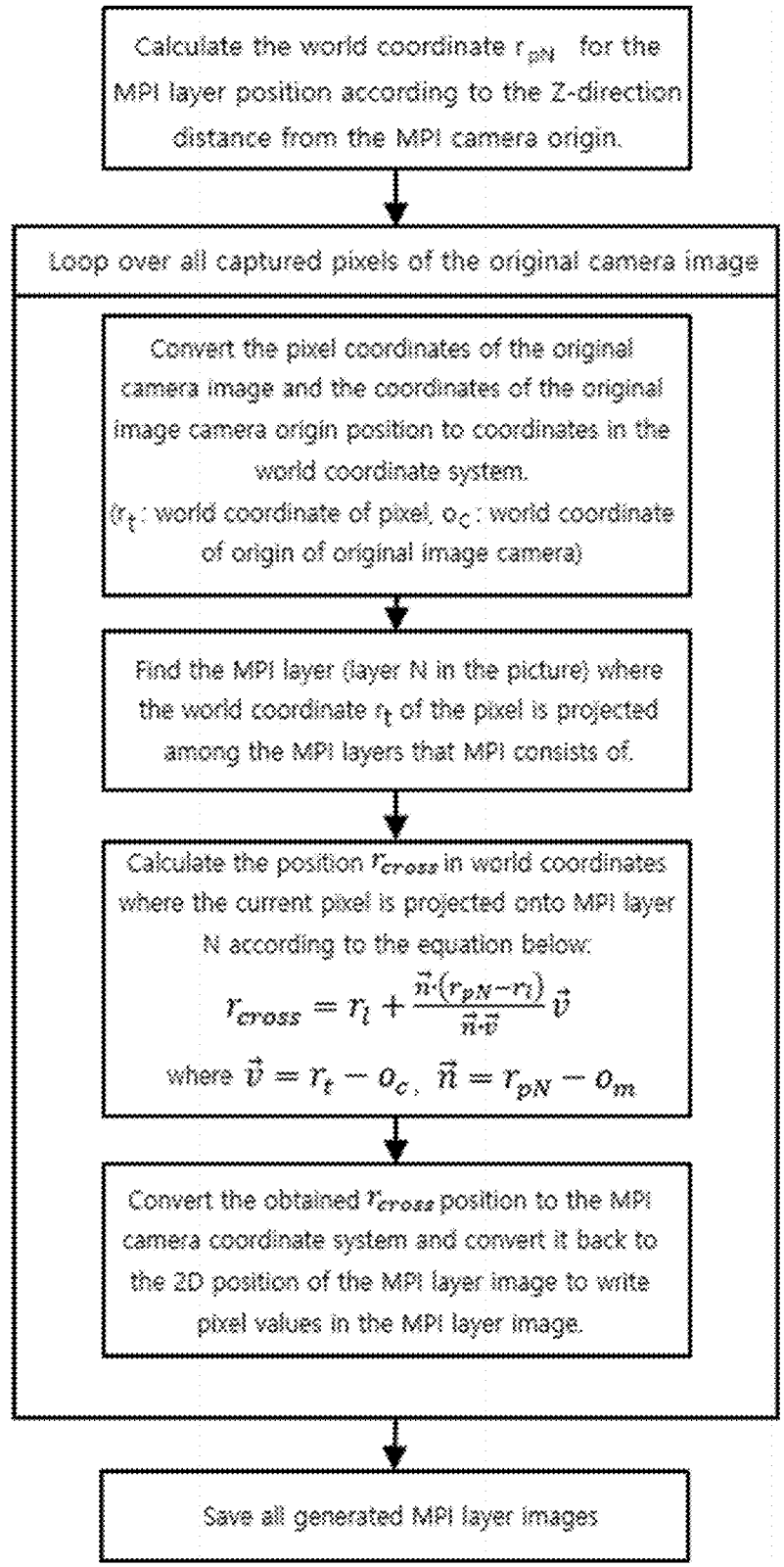
FIG. 11 shows a flowchart for a second MPI layer projection method.

FIG. 11 shows a flowchart for a second MPI layer projection method.

In a second MPI layer projection method, when a pixel from each camera for a shooting object is recorded, projection is performed by considering only a spatial position based on a MPI camera, so all pixels from each camera may be projected onto one point on a single MPI layer.

Figure 12:
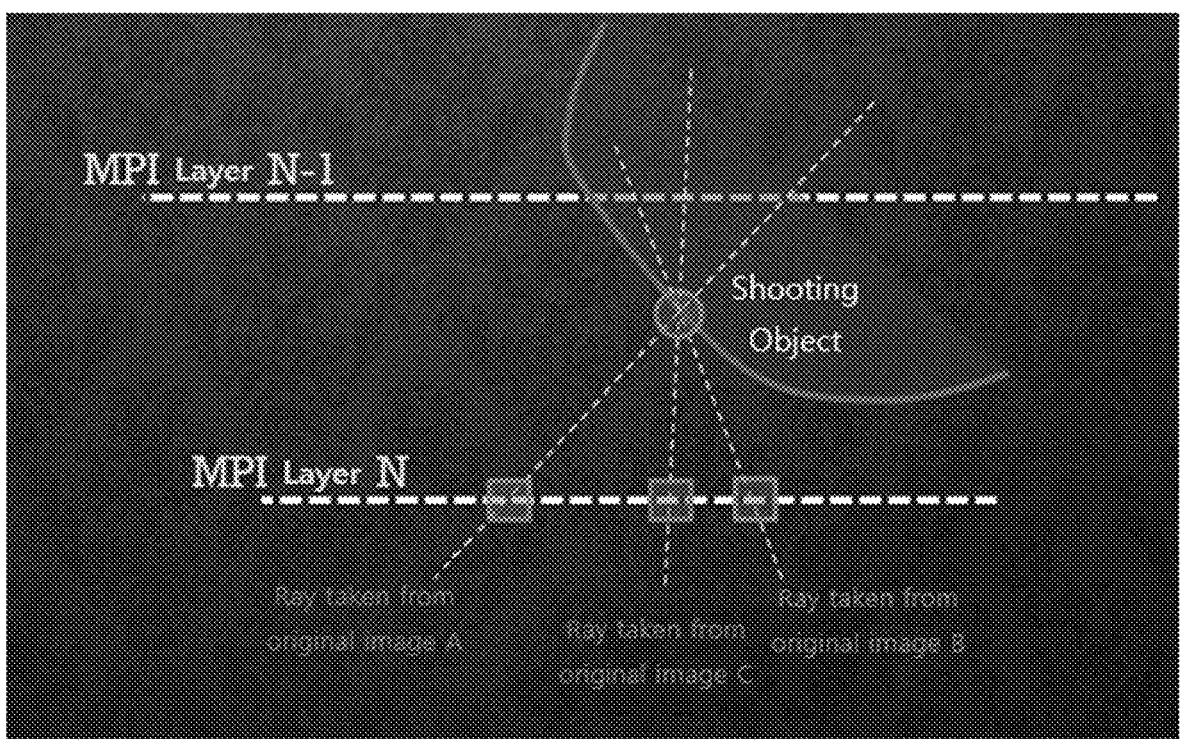
FIGS. 12 and 13 show an example of a second MPI layer projection method.
Figure 13:
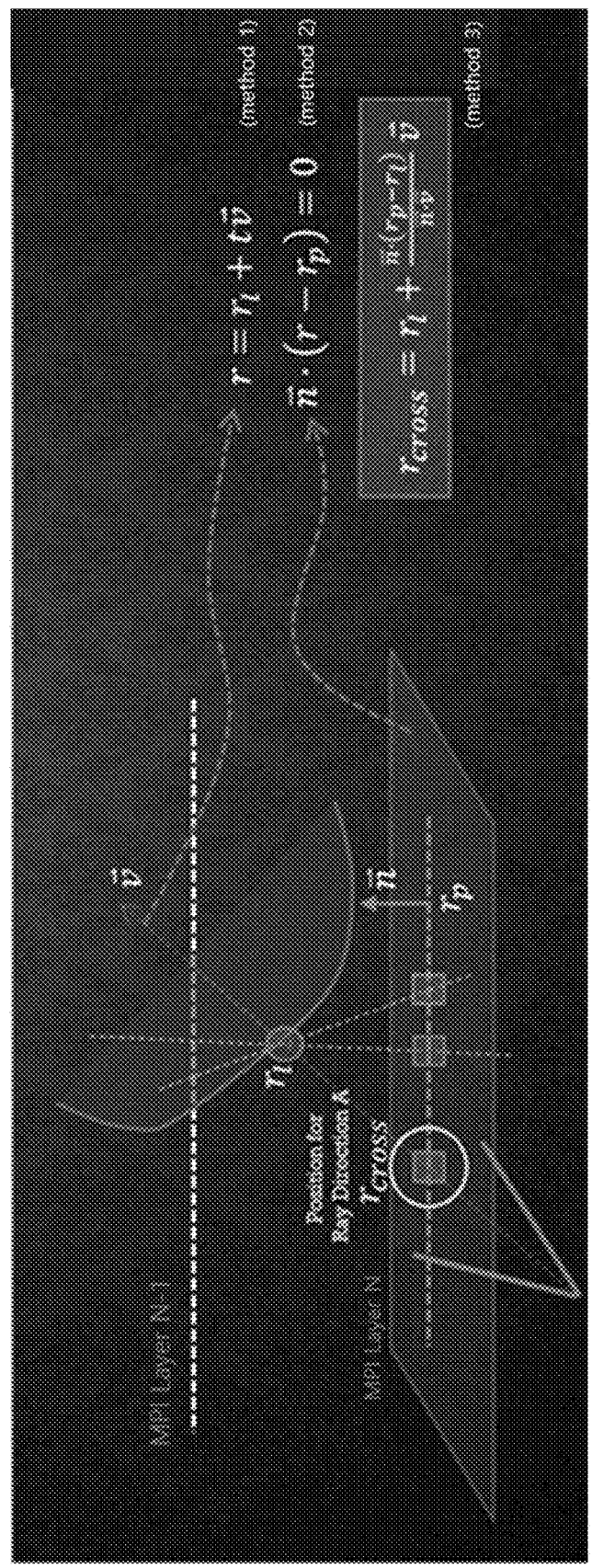

FIGS. 12 and 13 show an example of a second MPI layer projection method.

In a second MPI layer projection method, a position which meets a MPI layer on a space may be found separately per each individual original image camera position of a shot pixel (red circle) and each pixel value may be recorded at this meeting position.

A projection position determination method of a second MPI layer projection method FIG. 13 shows an equation for how a point meeting a MPI layer is calculated per each original camera.

(Equation 1) $r = r_l + t\vec{v}$ may be an equation of a straight line for a ray configured when a position (a red circle) of an object shot in the world coordinate system is shot on an original image camera. Here, $\vec{v}$ may be a direction vector of a corresponding ray and $r_l$ may be a position coordinate of a camera shot in the world coordinate system.

(Equation 2) $\vec{n} \cdot (r - r_p) = 0$ may be an equation of a plane for MPI layer N in the world coordinate system. Here, $\vec{n}$ may be a normal vector of a corresponding plane and $r_p$ may be a random point on a plane of corresponding MPI layer N in the world coordinate system.

(Equation 1) and (Equation 2) may be used to find $r_{cross}$ (a spatial position where a MPI layer plane and a shot ray meet in the world coordinate system) as in (Equation 3)

$$r_{cross} = r_l + \frac{\vec{n} \cdot (r_p - r_l)}{\vec{n} \cdot \vec{v}} \vec{v}.$$

Figure 14:
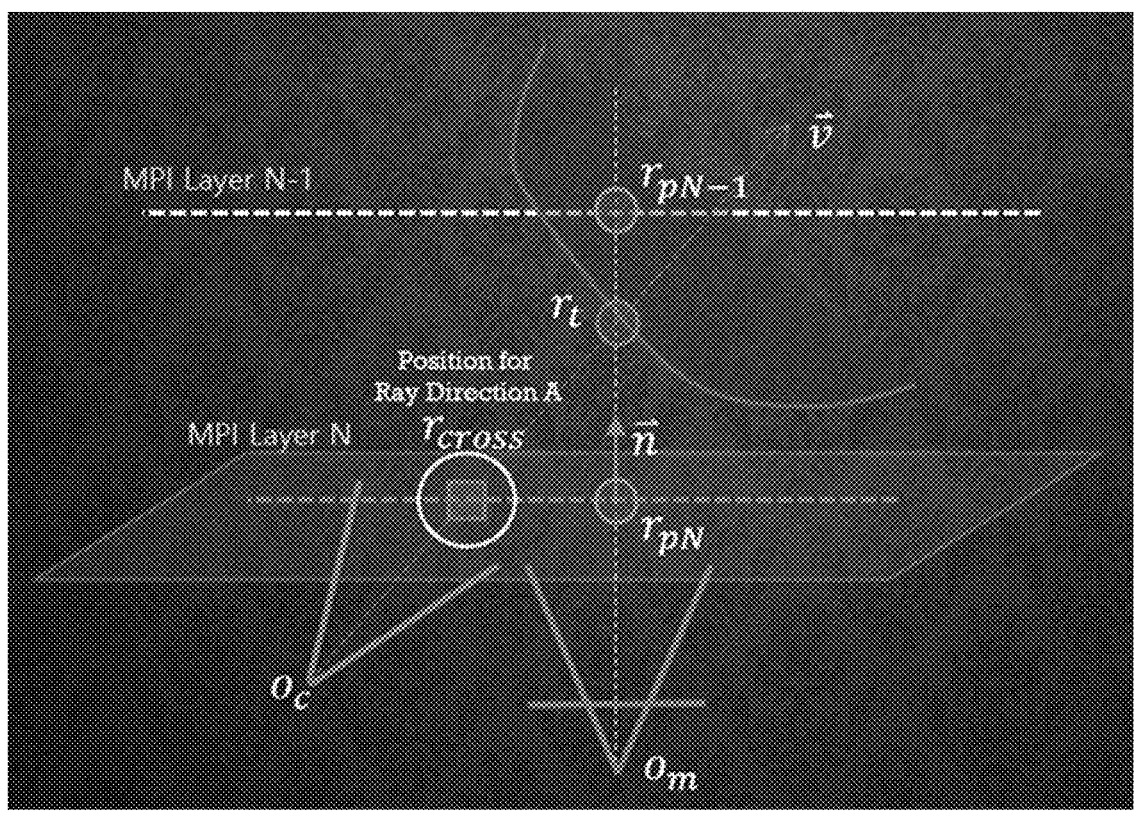
FIG. 14 is a diagram for describing a flowchart in FIG. 11.

FIG. 11 shows a flowchart for a second MPI layer projection method. FIG. 14 is a diagram for describing a flowchart in FIG. 11. FIG. 11 may be a flowchart for a method of finding an actual position of each pixel by using a concept above.

In reference to FIG. 11, as a first step, $r_{pN}$, a world coordinate for a MPI layer position, may be calculated according to a distance in a Z direction from a camera origin of a MPI.

As a second step, $r_l$, a pixel coordinate of an original camera image, and $o_c$, coordinate for an origin position of an original image camera, may be converted to a coordinate in the world coordinate system.

As a third step, among MPI layers configured with MPIs, a MPI layer (MPI layer N in FIG. 14) where $r_l$, a world coordinate of a pixel, is projected may be found.

As a fourth step, $r_{cross}$, a position where a current pixel is projected onto MPI layer N in a world coordinate, may be calculated according to Equation $$r_{cross} = r_l + \frac{\vec{n} \cdot (r_{pN} - r_l)}{\vec{n} \cdot \vec{v}} \vec{v}.$$

Here, it may be $\vec{v} = r_l - o_c$ and $\vec{n} = r_{pN} - o_m$.

As a fifth step, a calculated position of $r_{cross}$ may be converted to a MPI camera coordinate system and may be converted again to a 2D position of a MPI layer image to write a pixel value in a corresponding MPI layer image.

A second step to a fifth step, with a loop function, may be performed for all shot pixels of an original camera image.

As a sixth step, based on a result value through the loop function, all generated MPI layer images may be stored.

Exemplary methods of the present disclosure are expressed as a series of operations for clarity of a description, but it is not intended to limit order in which steps are performed and if necessary, each step may be performed simultaneously or in different order. In order to implement a method according to the present disclosure, other step may be additionally included in an exemplary step or some steps may be excluded and the remaining steps may be included or some steps may be excluded and an additional other step may be included.

A variety of embodiments of the present disclosure do not enumerate all possible combinations, but are intended to describe a representative aspect of the present disclosure, and matters described in a variety of embodiments may be applied independently or in combination of two or more.

In addition, a variety of embodiments of the present disclosure may be implemented by hardware, firmware, software or a combination thereof. For implementation by hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A scope of the present disclosure includes software or machine-executable instructions which execute an operation according to a method of a variety of embodiments on a device or a computer (e.g., an operating system, an application, a firmware, a program, etc.), and a non-transitory computer-readable medium that such software or instruction, etc. is stored and executable on a device or a computer.

What is claimed is:

1. A pixel ray crossing-based multi-viewpoint MPI geometry generation method, the method comprising:
   obtaining a multi-viewpoint image by original cameras which shoot a different viewpoint;
   obtaining a multi-plane image (MPI) based on the multi-viewpoint image;
   obtaining, based on the MPI, an atlas image in a 2D form; and
   obtaining a bitstream by encoding the atlas image,
   wherein obtaining the MPI is performed by projecting shot positions in a space for one shooting object onto a MPI layer plane for each of the original cameras,
   wherein positions that the shot positions in the space are projected onto the MPI layer plane are different from each other, and
   wherein each of the projecting shot positions is obtained by a formula $$r_{cross} = r_l + \frac{\vec{n} \cdot (r_p - r_l)}{\vec{n} \cdot \vec{v}} \vec{v},$$

the $r_l$ being a position coordinate of an 1-th original camera among the original cameras in a world coordinate system, the $r_{cross}$ being a projecting shot position in the space for the one shooting object onto the MPI layer place for the 1-th original camera, the $\vec{n}$ being a normal vector of the MPI layer plane, the $r_p$ being an arbitrary point on the MPI layer plane in the world coordinate system, and the $\vec{v}$ being a direction vector of a ray of the 1-th original camera.

2. The method of claim 1, wherein:
   the MPI layer plane is a MPI layer plane which is closest to the original cameras.

3. The method of claim 1, wherein:
   the atlas image is configured with a RGB image and an Alpha image.

4. A pixel ray crossing-based multi-viewpoint MPI geometry generation device, the device comprising:
   a MPI generator which obtains a multi-plane image (MPI) based on a multi-viewpoint image obtained by original cameras which shoot a different viewpoint;
   an atlas image generator which obtains an atlas image in a 2D form based on the MPI; and
   a 2D image encoder which obtains a bitstream by encoding the atlas image,
   wherein obtaining the MPI is performed by projecting shot positions in a space for one shooting object onto a MPI layer plane for each of the original cameras,
   wherein positions that the shot positions in the space are projected onto the MPI layer plane are different from each other, and
   wherein each of the projecting shot positions is obtained by a formula $$r_{cross} = r_l + \frac{\vec{n} \cdot (r_p - r_l)}{\vec{n} \cdot \vec{v}} \vec{v},$$

the $r_l$ being a position coordinate of an 1-th original camera among the original cameras in a world coordinate system, the $r_{cross}$ being a projecting shot position in the space for the one shooting object onto the MPI layer place for the 1-th original camera, the $\vec{n}$ being a normal vector of the MPI layer plane, the $r_p$ being an arbitrary point on the MPI layer plane in the world coordinate system, and the $\vec{v}$ being a direction vector of a ray of the 1-th original camera.

5. The device of claim 4, wherein:
   the MPI layer plane is a MPI layer plane which is closest to the original cameras.

6. The device of claim 4, wherein:
   the atlas image is configured with a RGB image and an Alpha image.

7. A non-statutory computer-readable recording medium storing a bitstream generated by a pixel ray crossing-based multi-viewpoint MPI geometry generation method, wherein:
   the pixel ray crossing-based multi-viewpoint MPI geometry generation method includes:
   obtaining a multi-viewpoint image by original cameras which shoot a different viewpoint;
   obtaining a multi-plane image (MPI) based on the multi-viewpoint image;
   obtaining, based on the MPI, an atlas image in a 2D form; and
   obtaining a bitstream by encoding the atlas image,
   wherein obtaining the MPI is performed by projecting shot positions in a space for one shooting object onto a MPI layer plane for each of the original cameras,
   wherein positions that the shot positions in the space are projected onto the MPI layer plane are different from each other, and
   wherein each of the projecting shot positions is obtained by a formula $$r_{cross} = r_l + \frac{\vec{n} \cdot (r_p - r_l)}{\vec{n} \cdot \vec{v}} \vec{v},$$

the $r_l$ being a position coordinate of an 1-th original camera among the original cameras in a world coordinate system, the $r_{cross}$ being a projecting shot position in the space for the one shooting object onto the MPI layer place for the 1-th original camera, the $\vec{n}$ being a normal vector of the MPI layer plane, the $r_p$ being an arbitrary point on the MPI layer plane in the world coordinate system, and the $\vec{v}$ being a direction vector of a ray of the 1-th original camera.

8. The non-statutory computer-readable recording medium of claim 7, wherein:
the MPI layer plane is a MPI layer plane which is closest to the original cameras.

9. The non-statutory computer-readable recording medium of claim 7, wherein:
the atlas image is configured with a RGB image and an Alpha image.

* * * * *